US012680865B2

(12) United States Patent
Cai et al.

(10) Patent No.: US 12,680,865 B2
(45) Date of Patent: Jul. 14, 2026

(54) QUASI-DISTRIBUTED SENSING USING ENHANCED SENSING STRUCTURES

(71) Applicant: SUBCOM, LLC, Eatontown, NJ (US)

(72) Inventors: Jin-Xing Cai, Morganville, NJ (US); Georg Heinrich Mohs, East Brunswick, NJ (US); Alexei N. Pilipetskii, Long Branch, NJ (US); Carl R. Davidson, Warren, NJ (US); William W. Patterson, Freehold, NJ (US)

(73) Assignee: SubCom, LLC, Eatontown, NJ (US)

( * ) Notice: Subject to any disclaimer, the term of this patent is extended or adjusted under 35 U.S.C. 154(b) by 263 days.

(21) Appl. No.: 18/496,349

(22) Filed: Oct. 27, 2023

(65) Prior Publication Data

US 2025/0137837 A1     May 1, 2025

(51) Int. Cl.
*G01H 9/00* (2006.01)
*G01D 5/353* (2006.01)
(52) U.S. Cl.
CPC ......... *G01H 9/004* (2013.01); *G01D 5/35361* (2013.01)
(58) Field of Classification Search
CPC .................... G01H 9/004; G01D 5/353361
See application file for complete search history.

(56) References Cited

U.S. PATENT DOCUMENTS

| | | | |
|---|---|---|---|
| 2016/0146661 A1 | 5/2016 | Martin et al. | |
| 2022/0206238 A1 | 6/2022 | Martin Regalado et al. | |
| 2022/0397448 A1 | 12/2022 | Pilipetskii et al. | |
| 2022/0397451 A1* | 12/2022 | Yano .................... | H04R 23/008 |

FOREIGN PATENT DOCUMENTS

| | | |
|---|---|---|
| CN | 114647000 A | 6/2022 |
| JP | H02103422 A | 4/1990 |

OTHER PUBLICATIONS

European Search Report for EP Application No. 24207734.5, dated Mar. 19, 2025, 10 pages.
Paul S. Westbrook, "Enhanced Optical Fiber for Distributed Acoustic Sensing beyond the Limits of Rayleigh Backscattering," iScience 23, 101137, CellPress Open Access, Jun. 26, 2020, 14 pages. [online source] URL: https://doi.org/10.1016/j.isci.2020.101137.

* cited by examiner

*Primary Examiner* — Jamel E Williams
(74) *Attorney, Agent, or Firm* — KDW Firm PLLC

(57) ABSTRACT

A system for distributed acoustic sensing comprising. The system may include a distributed acoustic sensing (DAS) station to launch a DAS signal into a DAS fiber; and an enhanced sensing array, the enhanced sensing array comprising at least one sensing component. The at least one sensing component may include a DAS fiber coil, forming a portion of the DAS fiber, and a low elastic modulus outer shell, surrounding the DAS fiber coil.

17 Claims, 7 Drawing Sheets

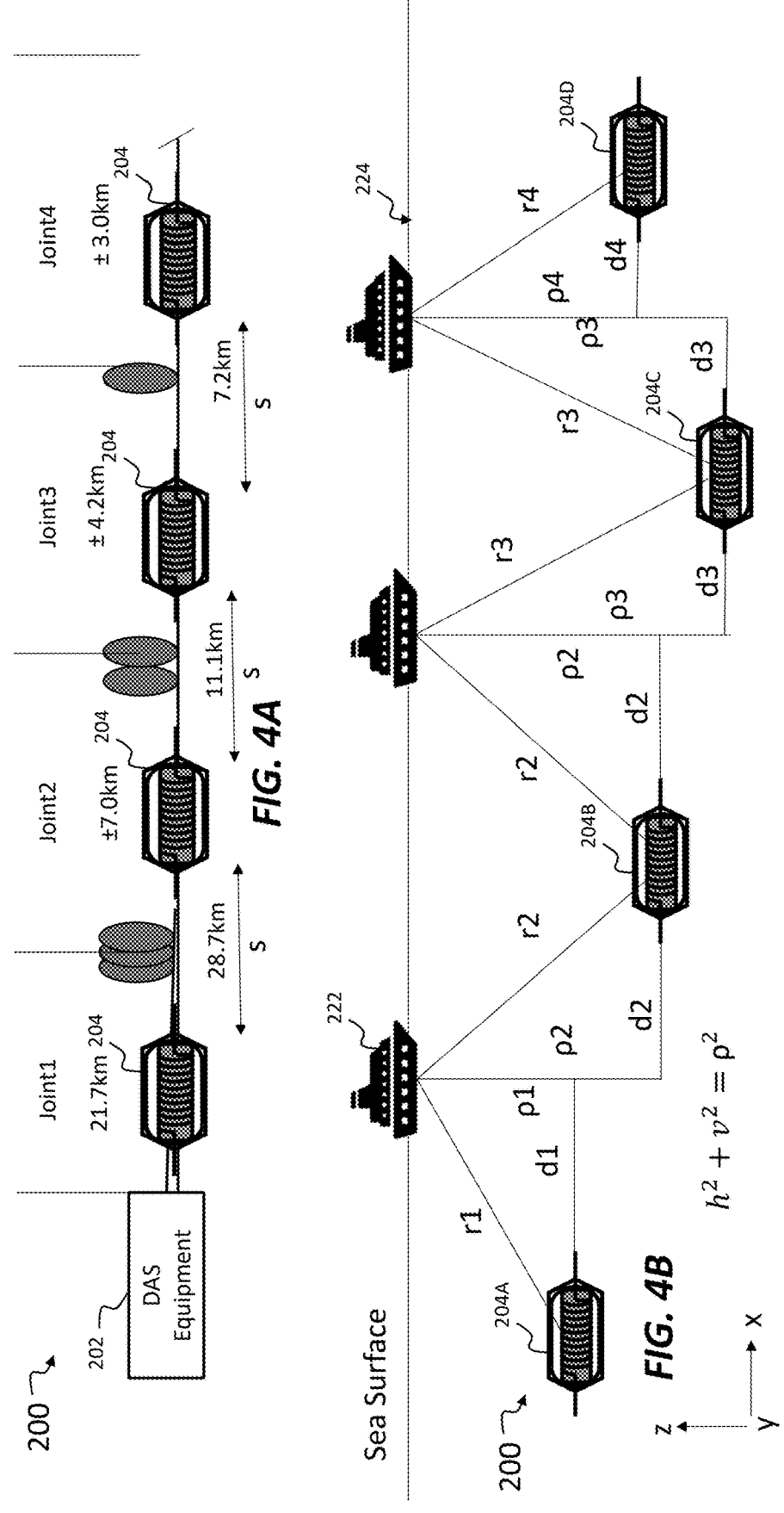

Figure 8:
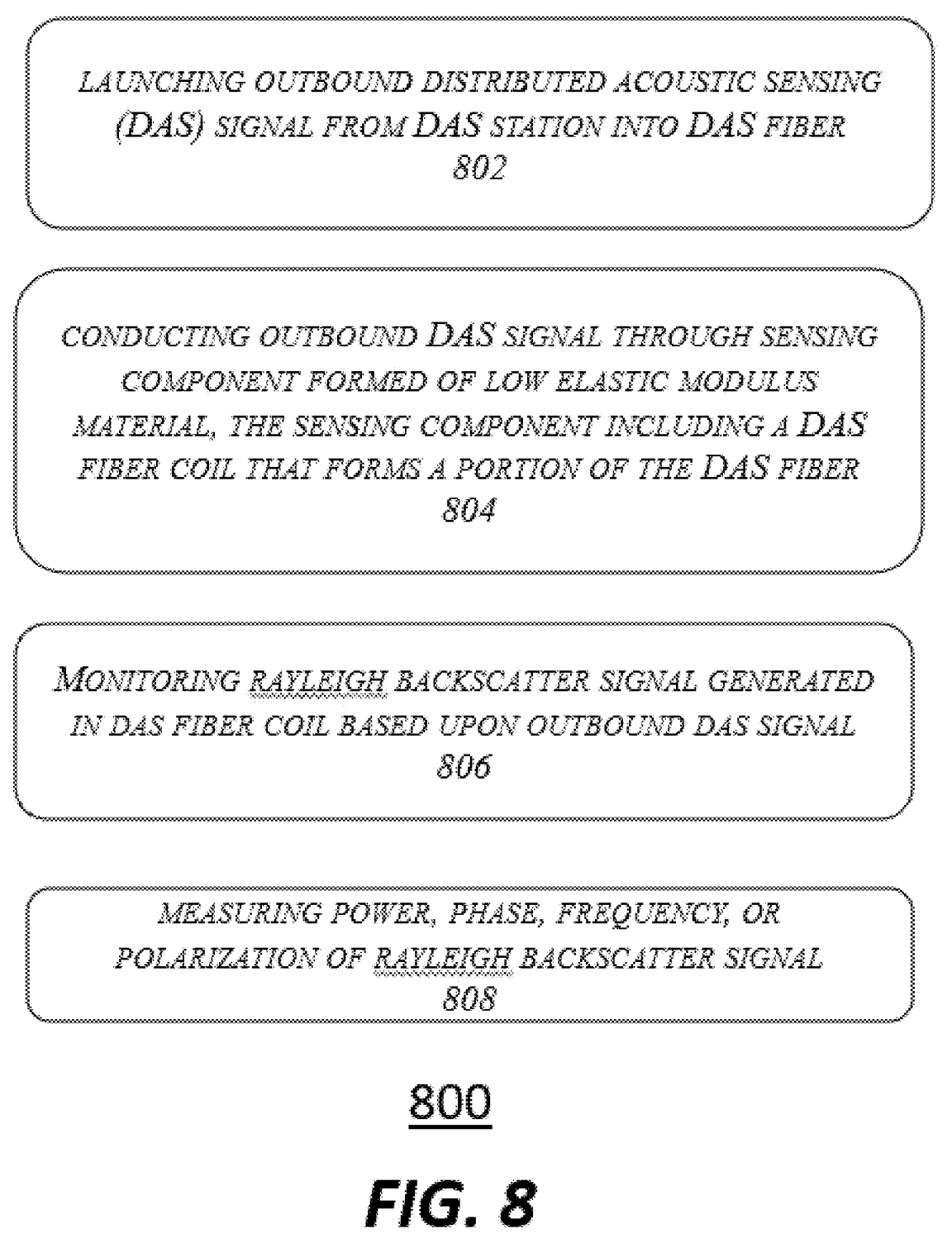

LAUNCHING OUTBOUND DISTRIBUTED ACOUSTIC SENSING (DAS) SIGNAL FROM DAS STATION INTO DAS FIBER
802

CONDUCTING OUTBOUND DAS SIGNAL THROUGH SENSING COMPONENT FORMED OF LOW ELASTIC MODULUS MATERIAL, THE SENSING COMPONENT INCLUDING A DAS FIBER COIL THAT FORMS A PORTION OF THE DAS FIBER
804

MONITORING RAYLEIGH BACKSCATTER SIGNAL GENERATED IN DAS FIBER COIL BASED UPON OUTBOUND DAS SIGNAL
806

MEASURING POWER, PHASE, FREQUENCY, OR POLARIZATION OF RAYLEIGH BACKSCATTER SIGNAL
808

QUASI-DISTRIBUTED SENSING USING ENHANCED SENSING STRUCTURES

FIELD

Embodiments of the present disclosure relate to the field of optical communication systems. In particular, the present disclosure relates to techniques for extending and improving the sensitivity of distributed acoustic sensing (DAS) in undersea optical cables.

DISCUSSION OF RELATED ART

In a distributed acoustic sensing (DAS) system, an optical cable may be used to provide continuous real-time or near real-time monitoring of perturbances or anomalies in the vicinity of the cable. In other words, the cable itself may be used as a sensing element to detect or monitor different types of disruptions, interferences, irregularities, acoustic vibrations, activities whether natural or man-made occurring in or out of the undersea environment, etc. in the DAS environment (e.g., terrestrial environment, oceanic). To do so, optoelectronic devices/equipment coupled to the optical cable of the DAS system may detect and process reflected light signals (e.g., Rayleigh backscatter signals) over a distance range in the DAS environment.

Generally, a DAS system may include a DAS station that acts as an interrogator unit (IU) to probe a fiber optic cable using a coherent laser pulse that represents an outbound DAS signal, where changes in the phase of the returning optical backscatter signal are measured. Optical phase shifts between pulses may be proportional to strain in the fiber, leading to the ability to detect vibrations and the like, as measured by the effect of such perturbations on the phase. For example, the DAS system may be based on Rayleigh scattering or more particularly Rayleigh backscattering (otherwise referred to as a Rayleigh-scattering-based DAS system).

In known approaches, distributed acoustic sensing employs an optical cable that includes an optical fiber to be used as the DAS sensor. The optical cable may further include steel wires, steel tapes and an outer jacket. The DAS sensor fiber may sense acoustic waves along the length of the cable that impact the cable and thus transmit a vibration into the DAS sensor fiber, resulting in a phase shift in the detected DAS signal (return DAS signal) that is returned to a detector and processor in the DAS station. One issue with this known DAS approach is the lack of acoustic sensitivity in an optical fiber that is encapsulated by layers of steel material, where the strength of acoustic waves is significantly attenuated before reaching the DAS sensor fiber. Thus, present day technology for deploying DAS sensing in a highly armored cable may exhibit less than ideal sensitivity for detecting acoustic disturbances.

It is with respect to these and other considerations that the present disclosure is provided.

BRIEF SUMMARY

In one embodiment, a system for distributed acoustic sensing is provided. The system may include a distributed acoustic sensing (DAS) station to launch a DAS signal into a DAS fiber; and an enhanced sensing array, the enhanced sensing array comprising at least one sensing component. The at least one sensing component may include a DAS fiber coil, forming a portion of the DAS fiber; and a low elastic modulus outer shell, surrounding the DAS fiber coil.

In another embodiment, a system for distributed acoustic may include a distributed acoustic sensing (DAS) station to launch a DAS signal into a DAS fiber, and an enhanced sensing array, the enhanced sensing array comprising a plurality of sensing components, arranged over a plurality of spans. A given sensing component of the plurality of sensing component may include a DAS fiber coil, forming a portion of the DAS fiber, and a low elastic modulus outer shell, surrounding the DAS fiber coil.

In a further embodiment, a method for distributed acoustic sensing is provided. The method may include launching an outbound distributed acoustic sensing (DAS) signal from a DAS station into a DAS fiber and routing the outbound DAS signal through a sensing component formed of a low elastic modulus material, where the sensing component includes a DAS fiber coil that forms a portion of the DAS fiber. The method may further include measuring a power, phase, frequency, or polarization of a reflected signal based upon the outbound DAS signal after the outbound DAS signal traverses the DAS fiber coil.

BRIEF DESCRIPTION OF THE DRAWINGS

FIG. 4A depicts an enhanced distributed acoustic sensing system, according to embodiments of the disclosure;

FIG. 4B depicts the geometry for scenarios for enhanced distributed acoustic sensing, according to embodiments of the disclosure;

FIG. 8 illustrates a process flow according to embodiments of the disclosure.

DESCRIPTION OF EMBODIMENTS

Figure 2:
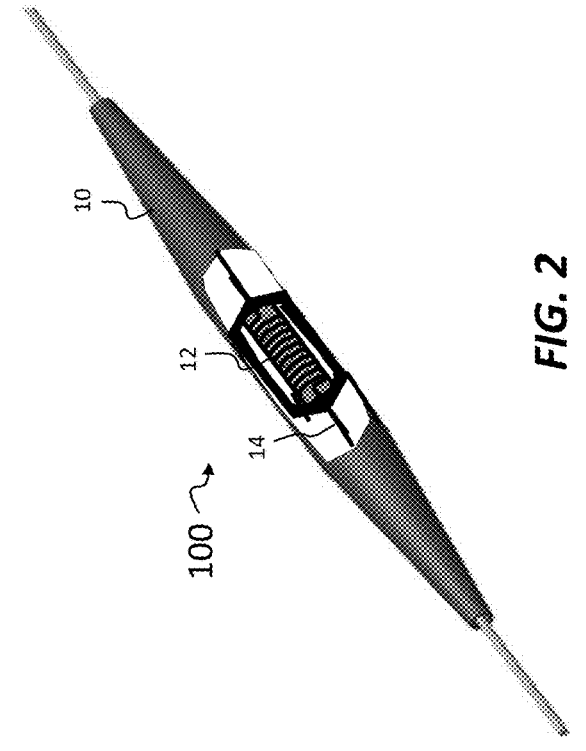
FIG. 2 shows a sensing component for enhanced DAS sensing that is embodied as a cable joint according to embodiments of the disclosure.

The present embodiments will now be described more fully hereinafter with reference to the accompanying drawings, in which exemplary embodiments are shown. The scope of the embodiments should not be construed as limited to the embodiments set forth herein. Rather, these embodiments are provided so that this disclosure will be thorough and complete, and will fully convey the scope of the embodiments to those skilled in the art. In the drawings, like numbers refer to like elements throughout.

Before detailing specific embodiments with respect to the figures, general features with respect to the embodiments will be reviewed. Novel DAS apparatus, systems, architectures, and techniques are provided to improve DAS sensing capability.

In some embodiments, novel enhanced sensing components are provided, based upon a coiled fiber, a low elastic modulus medium, housing or shell, or a combination of these elements. In some embodiments, novel architectures are provided for DAS sensing, including an array of a plurality of sensing components that perform what may be termed "quasi-distributed sensing."

Figure 1:
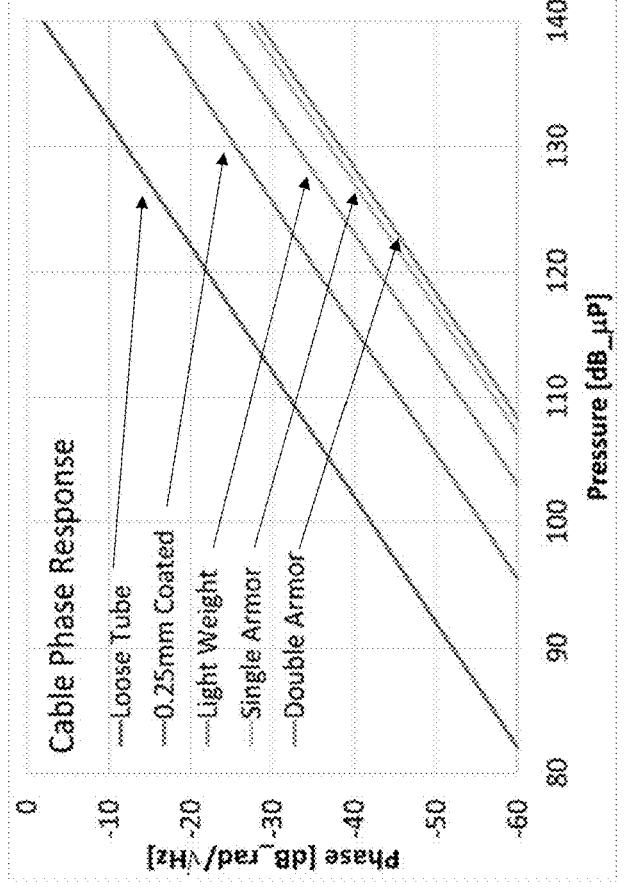
FIG. 1 is a graph illustrating the phase responsivity for several different cable types.

By way of explanation, FIG. 1 is a graph illustrating the phase responsivity for several different cable types. Note that the currently-deployed optical cables, including those cables employed for subsea communications systems and for DAS systems, are equipped with very strong protection to avoid damage to the optical fibers that carry optical signals used for communication and/or acoustic sensing, for example. In deep water, often what is termed a LW (light weight) cable is used. A LW cable consists of the optical fiber that is housed in a PBT (Poly-Butylene Terephthalate) tube, that is then surrounded in a concentric fashion by multi-layers of steel wires, then a copper conductor, and finally a polyethylene jacket, used as the insulator. For deployment in shallow waters, additional protection is often necessary to protect against fishing activity etc., including "single armored" or even "double armored" cable. These armored cables include extra layers of galvanized wires, steel tape and are surrounded by Nylon yarn on the outside. The steel wires, galvanized wires, and steel tape are all hard structures and therefore exhibit a very large elastic modulus (where a very large elastic modulus may refer to modulus greater than 100 GPa, and more particularly Young's modulus in the range from 150 to 220 GPa).

In FIG. 1, five curves are shown, illustrating five different cable types, where the phase response of an optical signal is plotted versus the strength or pressure of an external source. The occurrence of an event that generates acoustic waves will apply pressure to the core of an optical fiber, in a manner that changes the refractive index of the fiber and therefore effectively compresses and expands the fiber, resulting in an optical phase change accordingly. By measuring the power spectral density of this optical phase at acoustic frequencies one can determine the intensity of the acoustic wave. In FIG. 1, the results show that the detected optical phase is heavily cable dependent (where different cable types exhibit differing Young's modulus according to the constituent materials that make up the given cable). A higher phase response at a given pressure indicates higher responsivity, meaning that an acoustic signal that impinges on a given cable will yield a stronger phase response.

In particular, FIG. 1 compares the detected phase power in dB_rad/√Hz for five different cables as a function of pressure, where pressure would result from an acoustic wave. The behavior shown in these curves may be summarized as follows: the stronger the protection provided by the cable, the weaker the phase response. As suggested by FIG. 1, the use of a loose tube cable (a soft structure cable with a very low Young's modulus ~3-4 GPa) provides substantially better response than other cables—e.g., a 26-dB higher sensitivity compared to the double armor cable (this rigid cable has a large Young's modulus ~72 GPa). However, a loose tube cable can't be deployed in subsea cables due to the lack of protection for the fibers therein. Accordingly, for optical communications, and for DAS sensing, cable technologies that yield lower phase response are used, as illustrated by the lower four curves.

According to the results of FIG. 1, for DAS sensing, the existing more robust cable structures typically employed suffer from the relatively insensitive phase response to acoustic pressure. To address this issue FIG. 2 shows a sensing component 100, that may be employed to significantly enhance DAS sensing sensitivity according to embodiments of the disclosure. The sensing component 100 in this example may be embodied as a cable joint, which structure will include a housing 10. In some embodiments, as detailed with respect to figures to follow, the housing 10 may be formed using a low-Elastic-modulus material, such as polyethylene. The sensing component 100 may also include a fiber coil 12, which element may form part of an optical fiber that is coupled to a DAS station, discussed with respect to—embodiments to follow.

In operation, the sensing component 100 may be deployed in a subsea environment to detect acoustic signals, such as signals that are generated by disturbances, including earthquakes, ships, and so forth. The sensing component 100 may be deployed to perform "quasi distributed acoustic sensing" in that the sensing component 100 may detect disturbances from acoustic sources that may lie anywhere over a large region, such as up to 50 km from the sensing component 100, depending on the conditions in the surrounding terrain and other factors. As noted, the fiber coil 12 may be part of a fiber 14 that performs distributed acoustic sensing by sensing acoustic signals that may impact the fiber 14 over a length of the fiber 14, which length may span tens of kilometers. However, the sensing component 100 may perform enhanced DAS sensing by concentrating the sensitivity, such as the phase response discussed with respect to FIG. 1, at the location of the sensing component 100.

Turning to FIGS. 3A-3E, there are shown alternative sensing components for enhanced DAS sensing, according to different embodiments of the disclosure. In these embodiments, each sensing component may be provided as a cable joint that is capable of detecting an acoustic source within 20 km or so. As described with respect to FIGS. 4A-7 to follow, these sensing components may be deployed for DAS sensing over an arbitrarily long sensing range, where a given sensing component may be deployed over every few tens of kilometers, as an example, in order to provide quasi-DAS sensing over the entire sensing range.

Figures 3A, 3B, 3C, 3D, 3E:
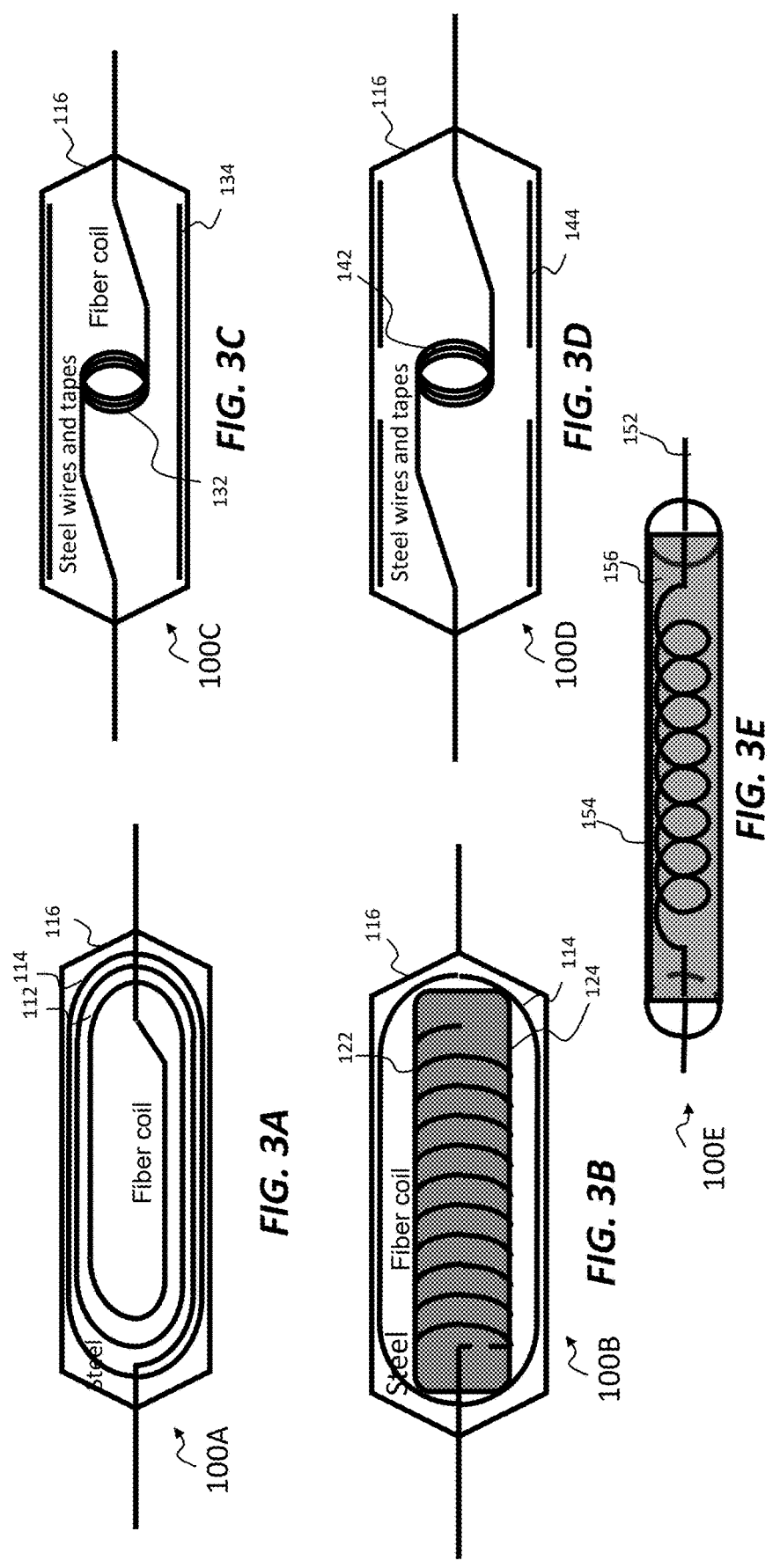
FIGS. 3A-3E illustrate alternative sensing components for enhanced DAS sensing, according to different embodiments of the disclosure.

Turning to FIG. 3A in particular, there is shown a sensing component 100A, including a housing, shown as outer shell 116, which outer shell may be formed of a low-elastic modulus material, such as polyethylene. The outer shell 116 may contain a fiber coil 112 that extends as part of a DAS fiber, from a DAS station. In this embodiment, the fiber coil 112 may be surrounded by a steel enclosure 114. By providing a fiber coil 112 in the sensing component 100A, and a low modulus for outer shell 116 the overall phase response of this structure may be improved at the position of the sensing component 100A. Note that for LW/SA cable, by excluding steel wire or copper/steel tape, the acoustic response will be comparable to a 0.25 mm coated fiber, that provides ~11.8/12.7 dB higher sensitivity.

The length of the fiber coil 112 (and other fiber coils to be discussed) may be tens of meters, such as 30 m to 100 m in some non-limiting embodiments. As a general rule, the length of the fiber coil 112 should be longer than the spatial resolution of the DAS instrument, where a 45 m long coiled fiber is sufficiently long in cases where 30 m spatial resolution is needed. By making the fiber coil 1.5 times the spatial resolution length, the response is guaranteed to fully cover one spatial-resolution position, no matter where the spatial-resolution boundary resides in the DAS receiver. Slightly longer (100 m) length for the fiber coil 112 will be useful to combat signal fading effects resulting from Rayleigh scattering effects. The fiber coil 112 may be deployed relatively loosely inside the joint structure so the fiber coil 112 can fully respond to changes in external acoustic pressure.

Note that in the embodiment of FIG. 3A, the coil may be arranged to lie flat in a plane. It is further noted that, while the sensitivity of the fiber coil per unit length of fiber may be similar to the sensitivity per unit length of a straight fiber, the use of a coiled fiber facilitates the provision of a much longer length of fiber, (e.g., 30 m to 100 m) within a relatively smaller joint (e.g., 30 cm to 50 cm in length).

Turning to FIG. 3B in particular, there is shown a sensing component 100B, including outer shell 116, steel enclosure 114, fiber coil 122, mandrel 124. In this embodiment, the fiber coil 122 is tightly wrapped around a mandrel 124, which may be formed using a low elastic modulus material, such as polyethylene of other solid. In the example of polyethylene that has a Young's modulus of about 0.3 GPa, where this modulus can provide 35 dB pressure sensitivity improvement as compared to a stand-alone single-mode fiber (SMF). Note that the mandrel 124 may be a hollow cylinder to enhance phase response to an acoustic signal. According to various embodiments, the sensitivity of the sensing component 100B depends on the ratio of the inner and outer diameter of the mandrel 124, and may therefore be adjusted to achieve better acoustic sensitivity with an optimized ratio of inner/outer diameter. A fiber length of 30 m-100 m for the fiber coil 122 as wound on the mandrel 124 is suitable according to some non-limiting embodiments of the disclosure.

Turning to FIG. 3C in particular, there is shown a sensing component 100C, including outer shell 116, steel layer 134, which layer may be formed of wires and/or tapes, and fiber coil 132, which coil may be arranged differently to fiber coil 112. Fiber acoustic sensitivity is proportional to $\cos^2(\theta)$, where $\theta$ is the incident angle between the acoustic wave from a moving object and the sensing fiber. When $\theta=90°$ (the acoustic wave is perpendicular to the sensing segment), no acoustic signal can be detected. In FIG. 3A, the sensing fiber is arranged on a surface or a plane, hence the sensitivity is smaller when the acoustic wave propagates perpendicular to the sensing fiber. By arranging the sensing fiber in a circular or even a spherical fashion, as suggested for the fiber coil 132 in FIG. 3C, the angle $\theta$ defined by the fiber coil and an incident acoustic signal may inherently vary from 0 to 90° over different positions along the length of the fiber coil 132, hence providing uniform sensitivity that is not dependent on the direction of the incident acoustic wave.

Turning to FIG. 3D in particular, there is shown a sensing component 100D, including outer shell 116, steel layer 144, which layer may be formed of wires and/or tapes, and fiber coil 142. In this example, a portion of the steel layer 144 may be removed, such as adjacent to the fiber coil 142, to provide enhanced acoustic wave penetration and hence enhanced optical phase response. In some embodiments, the fiber coil 142 may utilize an enhanced fiber structure that provides a higher Rayleigh backscatter response.

Turning to FIG. 3E in particular, there is shown a sensing component 100E, including steel enclosure 154, fiber coil 152, and low viscosity gel 156, surrounding the fiber coil 152. In this configuration, the fiber coil 152 can be arranged in a helical way in the gel, somewhat different than the wrapped coil structures of the embodiments of FIGS. 3A-3D. By appropriate design, the fiber length projected parallel to the steel tube can be similar as the fiber length projected perpendicular to the steel tube. Similar to the result of the embodiment of FIG. 3C, this helical design can also provide uniform sensitivity that is not dependent on the angle of the incident acoustic wave emanating from a moving object. Furthermore, the low viscosity gel 156 may provide enhanced phase response.

FIG. 4A depicts an enhanced distributed acoustic sensing (DAS) system, shown as DAS system 200, according to embodiments of the disclosure. In this example, DAS sensing is facilitated over a 50 km range, using 4 sensing components that are arranged as cable joints equipped with a coiled fiber. The sensing components 204 may be arranged in a similar fashion to any of the aforementioned embodiments shown in FIGS. 3A-3E, for example. The DAS system 200 includes a DAS station 202 that is arranged to launch an outbound signal that may be termed an outbound DAS signal, for example, using a DAS transmitter. DAS stations are known in the art, and details of the DAS station 202 will not be discussed further herein. In this example the distance (S) between each pair of adjacent sensing components, meaning the sensing components 204, is different. This differing distance is set in order to accommodate the fact that the input power to each sensing component 204 is different due to optical fiber loss. The $1^{st}$ of the sensing components 204, nearest to the DAS station, may have the highest power; hence the first of the sensing components 204 can in principle detect acoustic signals over the longest distance (in one example, this distance is estimated to be 21.7 km); the $2^{nd}$ of the sensing components 204 may be determined to be capable of just detecting acoustic signals over a range of ±7.0 km, meaning a distance from approximately 7 km closer to the DAS station 202 with respect to the sensing component 204, to a distance 7 km further away from the DAS station 202 with respect to the DAS station 202. The $3^{rd}$ of the sensing components 204 may be assumed to be capable of detecting acoustic signals over a range of ±4.2 km, while the last of the sensing components 204 is assumed to be capable of detecting acoustic signals over a range of just ±3.0 km—with the assumption that all of the sensing components 204 exhibit the same minimum responsivity (assuming the acoustic source may be located at the same depth as the sensing components 204). The total maximum sensing distance afforded by the DAS system 200 may therefore be calculated to be 28.7 km+11.1 km+7.2 km+3 km=50 km. In this example, we assume that the ship is directly above the sensing cable.

With reference also to FIG. 4A, FIG. 4B depicts the geometry for scenarios for enhanced distributed acoustic sensing, according to embodiments of the disclosure. In this example, a portion of a variant of the DAS system 200 is shown, including the four of the sensing components 204, shown as sensing component 204A, sensing component 204B, sensing component 204C, and sensing component 204D. While just four sensing components are shown in this example, it may be understood that a DAS system, such as DAS system 200, may include up to many dozens of such sensing components.

Example Determination for Suitable Configuration of Sensing Components

In the context of deploying a DAS sensing system, such as DAS system 200, in a subsea environment, an acoustic source, such as a ship 222, located on the sea surface 224, may not be positioned directly above the sensing cable that includes the sensing components 204. Moreover, not all of the sensing components 204 may be positioned at the same depth below the sea surface 224. Accordingly, the spacing between the sensing components may be optimized globally to ensure a similar minimal responsivity for the sensing components 204 within the coverage range of one of the individual sensing components of sensing components 204.

In one approach, to establish the proper configuration of sensing components 204, one design philosophy is to set the optimum joint (sensing component 204) spacing (see distance S) such that the DAS signal loss between the two adjacent joints (round trip loss) equals the transmission loss (TL) difference of the acoustic wave between the ship 222 and the two adjacent joints. The transmission loss of an acoustic wave can be modeled as a simple $r^2$ versus distance or based upon a more sophisticated model including water loss, Lloyd mirror effects, reflection and absorption by ocean floor etc. Assuming 0.2 dB/km fiber loss, and using the simple $r^2$ law, one can set the following equations to optimize the joint spacing:

$$2*(d1 + d2)*0.2 = TL_{Ship-J1} - TL_{Ship-J2} \approx 20\log\frac{r1}{r2} \qquad \text{Eq (1)}$$

$$2*(d2 + d3)*0.2 = TL_{Ship-J2} - TL_{Ship-J3} \approx 20\log\frac{r2}{r3} \qquad \text{Eq (2)}$$

$$2*(d3 + d4)*0.2 = TL_{Ship-J3} - TL_{Ship-J4} \approx 20\log\frac{r3}{r4} \qquad \text{Eq (3)}$$

$$d1 + 2*d2 + 2*d3 + 2*d4 = D \qquad (4)$$

As shown in FIG. 4B, the different parameters, shown as r1, r2, r3, and r4 represent the shortest distance from the ship 222 at the 3 different illustrated locations relative to sensing component 204A, sensing component 204B, sensing component 204C, and sensing component 204D, respectively. Other parameters such as h1 to h4 (not shown in FIG. 4B) may be set to represent the shortest horizontal distance to the sensing cable from the ship 222, and v1 to v4 (not shown in FIG. 4B) may be set as the shortest vertical depth of the cable to the ship 222. Thus, for a given set of h and v values, a corresponding value p may be determined which represents the shortest distance from the ship 222 to a given sensing component, where $h^2+v^2=\rho^2$. Said differently, the value of p represents the hypotenuse of a right triangle when a given one of the sensing components 204 is located directly under the ship 222 in the X-Z plane shown, at a depth equal to v and displaced at a distance h in the Y-Z plane. For each different sensing component, a set of parameters $\rho1$ to $\rho4$ then represent the shortest distance from the ship 222 to the respective sensing component 204A to 204D. Additionally, a set of parameters, d1, d2, d3, and d4, represent the corresponding maximum sensing distance along the optical fiber, for sensing component 204A, sensing component 204B, sensing component 204C, sensing component 204D, respectively. A parameter (D) may be set to represent the overall maximum sensing distance (D=d1+2*d2+2*d3+2*d4), where the total sensing fiber length is equal to D−d4.

Regarding Eq (1), this equation will not converge when r2 or d2 is too large (optical fiber loss is too much). In this case, one can just minimize the loss difference between DAS signal loss in optical fiber (assuming 0.2 dB/km in Eq (5)) and the acoustic wave loss difference between two joints in water:

$$\min\{abs[2*(d1+d2)*0.2 - (TL_{Ship-J1} - TL_{Ship-J2})]\} \approx \qquad \text{Eq(5)}$$

$$\min\left\{abs\left[2*(d1+d2)*0.2 - 20\log\frac{r1}{r2}\right]\right\}$$

Figure 5:
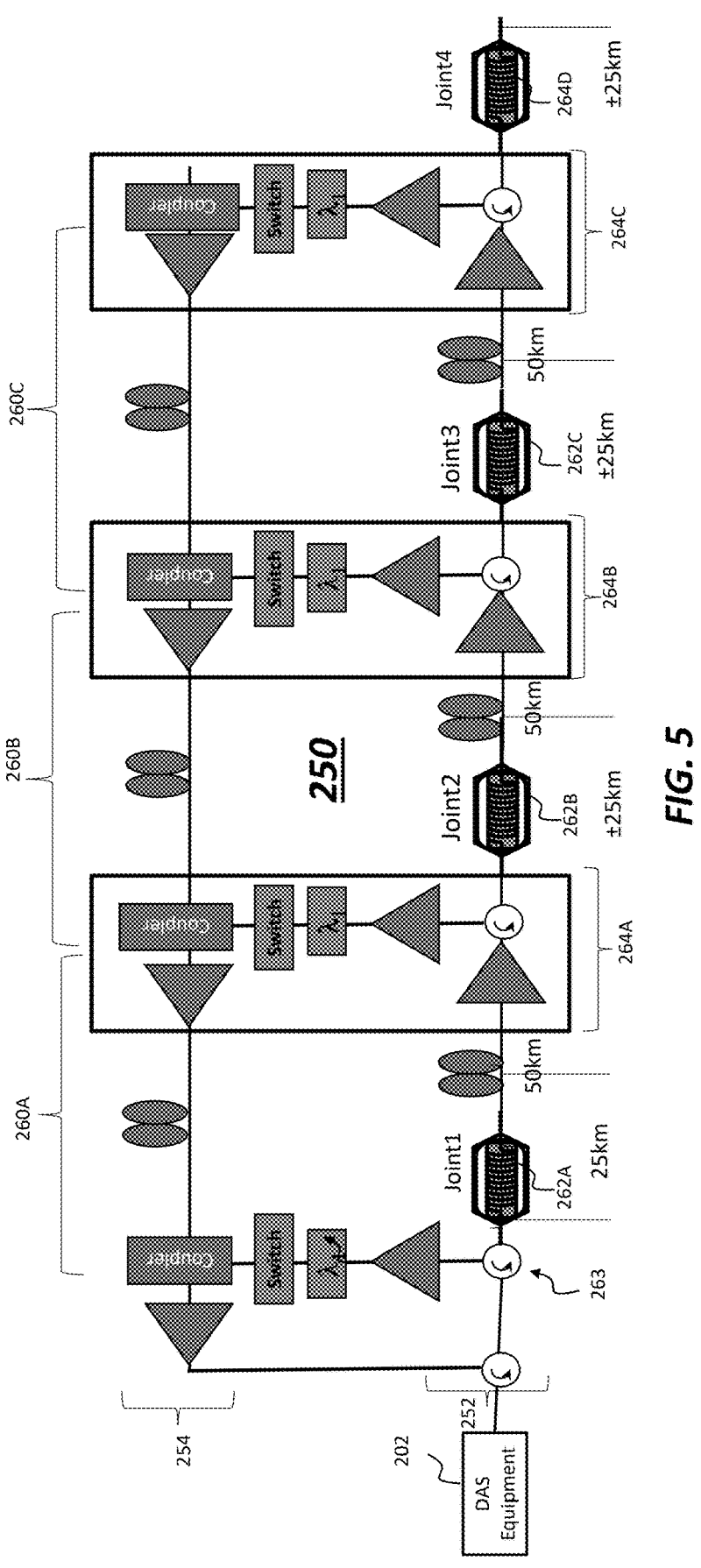
FIG. 5 depicts another enhanced distributed acoustic sensing system, according to embodiments of the disclosure.

In accordance with additional embodiments of the disclosure, a sensing component may be implemented in a joint that is integrated into a multi-span amplified system with amplified-filtered loop back (AFLB). FIG. 5 shows one implementation of such a system, according to various embodiments of the disclosure. The system 250 of FIG. 5 includes the DAS station 202 and a set of components that form an outbound path 252, an additional set of components that form a return path 254. In the example of FIG. 5, three spans are depicted as span 260A, span 260B, and span 260C. However, it may be understood that the system of FIG. 5 may be implemented in N spans, where N represents any suitable integer. In this example, just one sensing component (joint) may be needed for each span that covers a distance of 50 km, since the respective sensing component 262A, sensing component 262B, and sensing component 262C may be configured to detect acoustic signals over a range of +/−25 km. Note that these sensing components may be configured generally as described with respect to the embodiments of FIGS. 3A-3E.

The system 250 includes, in addition to a loopback 263, a plurality of repeaters, shown as repeater 264A, repeater 264B, and repeater 264C, where these repeaters may each be configured with amplified-filtered loop back (AFLB) including couplers, erbium doped fiber amplifiers (EDFA), switches, filters, circulators, as known in the art. In the system 250, DAS sensing of an outbound DAS signal launched from the DAS station 202 takes place on the outbound path 252, while the return path 254 is used to carry the sensing signal back, via loopbacks at the various repeaters to the DAS station 202. Note that in this embodiment and other embodiments, a first fiber of a fiber pair may be used to conduct outbound DAS signals over the outbound path 252, while a second fiber of the fiber pair is used to conduct a return signal via the return path 254.

Another advantage provided by the system 250 is that no transmission fiber is needed for the very last span, since an (n−0.5)*50 km link can be sensed with just n joints (given a 50-km repeater spacing). In addition, the signal to noise ratio (SNR) of the last sensing component (furthest from the DAS station 202) is increased thanks to no extra noise reflection from the 'missing' span.

Figure 6:
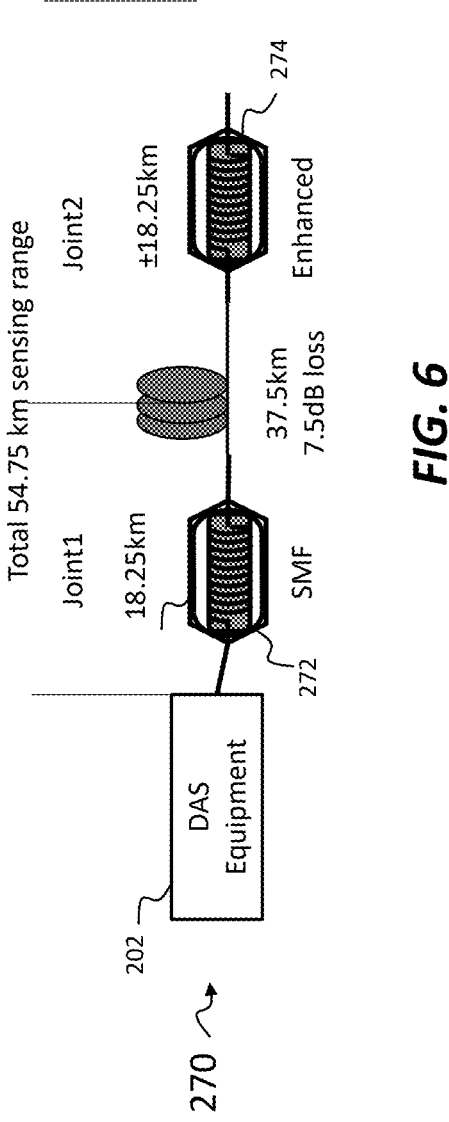
FIG. 6 depicts a further enhanced distributed acoustic sensing system, according to embodiments of the disclosure.

FIG. 6 depicts a further enhanced distributed acoustic sensing system, according to embodiments of the disclosure. The system 270 includes DAS station 202 and a set of two sensing components, shown as sensing component 272 and sensing component 274, which sensing component may include an enhanced fiber coil segment formed using an enhanced coiled fiber material. Note that these sensing components may be configured generally as described with respect to the embodiments of FIGS. 3A-3E. By way of reference, recently, optical fibers having a relatively higher Rayleigh backscattering coefficient have been developed for distributed sensing. In particular an enhanced scattering fiber with ~15 dB OSNR improvement compared to standard SMF, has been developed. However, this special fiber can best be used locally to improve the DAS signal power. If such a special fiber is used for an entire link, the noise power will be increased by the same 15 dB, due to the higher loss in the special fiber, resulting in no overall OSNR improvement.

The embodiment of FIG. 6 harnesses the advantage of using a fiber sensor coil having enhanced scattering properties with higher Rayleigh backscattering while avoiding the disadvantage of increased noise that would occur if the sensing components with enhanced scattering fiber coils were deployed over an entire link.

The use of just 37.5 km length of optical fiber and 2 cable joints (sensing component 272 and sensing component 274) in order to cover acoustic detection over a single span ~55 km. The first joint, sensing component 272, which component may be deemed to have an unenhanced fiber coil segment, uses a coil made of SMF, and the $2^{nd}$ joint, sensing component 274, uses a coil made of an enhanced scattering fiber. The 15 dB improvement from the enhanced scattering cancels the round-trip loss (15 dB) from the 37.5 km fiber, so the DAS signal power is at the same level from sensing component 272 and sensing component 274. Hence, each of the sensing components can cover the same sensing distance (±18.25 km) with the same responsivity.

Figure 7:
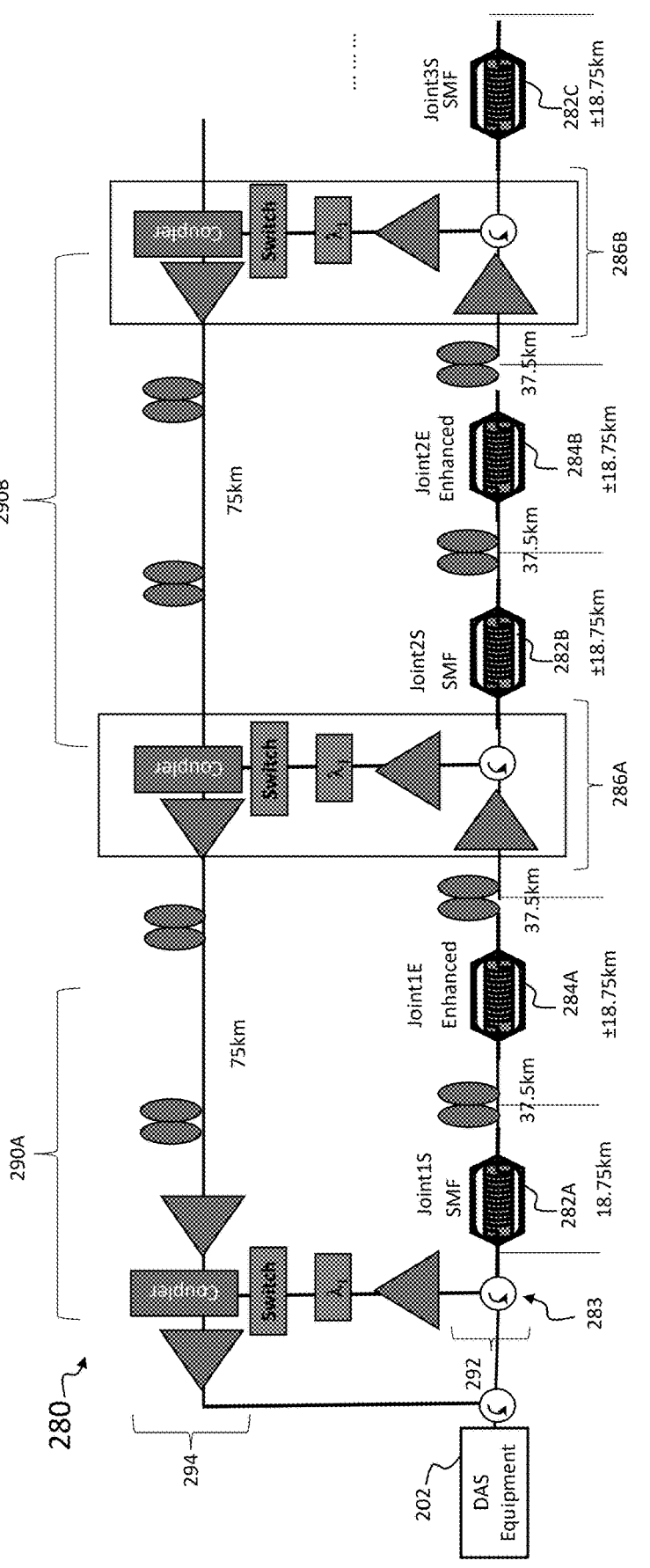
FIG. 7 depicts yet another enhanced distributed acoustic sensing system, according to embodiments of the disclosure.

FIG. 7 depicts yet another enhanced distributed acoustic sensing system, according to embodiments of the disclosure. In this example, the system 280 is depicted as covering two spans, span 290A and span 290B. However, it may be understood that the system of FIG. 7 may be implemented in N spans, where N represents any suitable integer. The embodiment of FIG. 7 employs a heterogeneous arrangement of sensing components, where, in a given span, a sensing component (sensing component 282A, sensing component 282B) having a fiber coil formed of standard SMF is deployed nearest to the DAS station 202, while a sensing component (sensing component 284A, sensing component 284B) having a fiber coil made of enhanced scattering fiber is deployed further away from the DAS station 202. Note that these sensing components may be configured generally as described with respect to the embodiments of FIGS. 3A-3E.

In addition to a loopback 283, loopbacks are provided at repeater 286A and repeater 286B, to route the outbound DAS signal on outbound path 292 back to the DAS station on return path 294. Again, the sensing components are provided just on outbound path 292.

In the example illustrated in FIG. 7, the repeater spacing is increased to 75 km from a previous example of 50 km by using a standard fiber material joint (sensing components 282A, 282B) and an enhanced scattering fiber coil joint (sensing components 284A, 284B) in a given sensing span. In accordance with the aforementioned embodiment of FIG. 6, one can manage the accumulated amplified spontaneous emission (ASE) to ensure the same responsivity in all sensing elements. By increasing the repeater spacing to 75 km, this implementation just needs 2 repeaters compared with 3 repeaters in the configuration of FIG. 5, thereby reducing the cost.

To recap, a quasi-distributed fiber sensing approach as disclosed herein, provides sensing of acoustic sources not just in the immediate vicinity, but also detection of acoustic sources up to 50 km away, depending on the prevailing conditions in the surrounding terrain. Therefore, given the deployment of sensing components such as in joints along an optical fiber as detailed herein, at intervals on the order of several kilometers to tens of kilometers, a fully distributed sensing system is not necessary in order to monitor acoustic sources over any desired coverage range.

Note that the relative spacing of sensing components in a quasi-distributed sensing system may be chosen according to the intended use. For example, for monitoring ships, to determine the location, speed and direction of a ship, the received phase information is best collected from 3 to 5 different locations. So, for ship monitoring in a single span or multi-span communications system, the deployment of 3 to 5 sensing components may be necessary.

Moreover, according to additional embodiments of the disclosure, a sensing system may be implemented using a combination of a) several discrete joints containing fiber coils that are spaced apart from one another by many kilometers as the main sensors, b) distributed fiber sensors along the length of the optical fiber as auxiliary sensors, in order to achieve hybrid quasi-distributed sensing system.

FIG. 8 illustrates a process flow 800 according to embodiments of the disclosure. At block 802, an outbound distributed acoustic sensing (DAS) signal is launched from a DAS station into a DAS fiber.

At block 804, the outbound DAS signal is conducted through sensing component formed of low elastic modulus material, the sensing component including a DAS fiber coil that forms a portion of the DAS fiber.

At block 806, a Rayleigh backscatter signal is monitored that is generated in the DAS fiber coil, as is based upon the outbound DAS signal. At block 808 the power, phase, frequency, or polarization of the Rayleigh backscatter signal is measured, processed, and analyzed.

The quasi-distributed sensing approach as disclosed herein can significantly reduce the amount of digital signal processing required to extract the necessary sensing information. As an example, assuming a span length of 50-km using 30 m spatial resolution, all phase information along the 50-km link (1667×30 m) should be processed if a regular fully distributed sensing system is employed. Using a single sensing component deployed in a cable joint (assuming 90 m coiled fiber length and still 30 m spatial resolution), only 3×30 m of information needs to be processed to monitor the same 50 km link. However, information from auxiliary sensors may be needed during the initial stage for phase calibration. Overall, the amount of digital signal processing can be reduced to $\frac{1}{100}^{th}$ for a quasi-distributed sensing system compared to a standard fully distributed sensing system as disclosed in the aforementioned embodiments herein.

Herein, novel and inventive apparatus, systems, structures, and techniques for providing a less complex approach to distributed acoustic sensing are provided.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation, in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system for distributed acoustic sensing comprising:
a distributed acoustic sensing (DAS) station to launch a DAS signal into a DAS fiber; and
an enhanced sensing array, the enhanced sensing array comprising at least one sensing component embodied in a cable joint, the at least one sensing component comprising:
a DAS fiber coil, forming a portion of the DAS fiber; and
a low elastic modulus outer shell, surrounding the DAS fiber coil.

2. The system of claim 1, the low elastic modulus outer shell comprising polyethylene.

3. The system of claim 1, wherein the at least one sensing component comprises at least three enclosures, wherein a first separation between a first sensing component, located nearest to the DAS station, and a second sensing component, located second-nearest to the DAS station, is greater than a second separation between the second sensing component and a third sensing component, located third nearest the DAS station.

4. The system of claim 1, wherein the at least one sensing component comprises a plurality of enclosures, arranged in a plurality of cable joints, respectively, each cable joint including a local DAS fiber coil, wherein at least one cable joint is arranged within one or more spans of a multi-span communications system.

5. The system of claim 4, wherein the DAS fiber forms a first fiber of a fiber pair, wherein the first fiber is coupled to a DAS transmitter at the DAS station to conduct an outbound signal, and wherein a second fiber of the fiber pair is arranged to conduct a return signal to a receiver at the DAS station, the return signal being derived from the outbound signal after routing through a loopback located at the one or more spans.

6. The system of claim 4, wherein a plurality of cable joints is arranged within a given span of the multi-span communications system.

7. The system of claim 6, where a first cable joint of the plurality of cable joints, located relatively closer to the DAS station, includes an unenhanced fiber coil segment, and wherein a second cable joint of the plurality of cable joints, located relatively further from the DAS station, includes an enhanced fiber coil segment, wherein the enhanced fiber coil segment has a relatively higher Rayleigh backscattering coefficient than the unenhanced fiber coil segment.

8. The system of claim 1, wherein the enhanced sensing array comprises at least two sensing components, arranged as at least two cable joints, respectively, wherein a first cable joint of the at least two cable joints, located relatively closer to the DAS station, includes an unenhanced fiber coil segment, and wherein a second cable joint of the at least two cable joints, located relatively further from the DAS station, includes an enhanced fiber coil segment, wherein the enhanced fiber coil segment has a relatively higher Rayleigh backscattering coefficient than the unenhanced fiber coil segment.

9. A system for distributed acoustic sensing, comprising:
a distributed acoustic sensing (DAS) station to launch a DAS signal into a DAS fiber within an optical cable;
an enhanced sensing array, the enhanced sensing array comprising a plurality of sensing components formed in select ones of a plurality of cable joints along the optical cable, arranged over a plurality of spans, wherein a given sensing component of the plurality of sensing components comprises:
a DAS fiber coil, forming a portion of the DAS fiber; and
a low elastic modulus outer shell, surrounding the DAS fiber coil.

10. The system of claim 9, each cable joint of the plurality of cable joints including a local DAS fiber coil, wherein a given cable joint is arranged within a given span of a multi-span communications system.

11. The system of claim 9, the low elastic modulus outer shell comprising polyethylene.

12. The system of claim 9, wherein the DAS fiber forms a first fiber of a fiber pair, wherein the first fiber is coupled to a DAS transmitter at the DAS station to conduct an outbound signal, and wherein a second fiber of the fiber pair is arranged to conduct a return signal to a receiver at the DAS station, the return signal being derived from the outbound signal after routing through a loopback located at the one or more spans.

13. The system of claim 10, wherein each span of the multi-span communications system includes just one cable joint, having a DAS fiber coil.

14. The system of claim 10, where a given span of the multi-span communications system comprises:
a first cable joint, located relatively closer to the DAS station, the first cable joint including an unenhanced fiber coil segment; and
a second cable joint, located relatively further from the DAS station, the second cable joint including an enhanced fiber coil segment, wherein the enhanced fiber coil segment has a relatively higher Rayleigh backscattering coefficient than the unenhanced fiber coil segment.

15. A method for distributed acoustic sensing comprising:
launching an outbound distributed acoustic sensing (DAS) signal from a DAS station into a DAS fiber;
conducting the outbound DAS signal through a sensing array that includes a plurality of sensing components arranged in a plurality of cable joints, each sensing component formed of a low elastic modulus material and including a local DAS fiber coil that forms a portion of the DAS fiber wherein the sensing component is one of a plurality of sensing components, arranged in a plurality of cable joints, respectively in a plurality of spans of a multi-span communications system; and
measuring a power, phase, frequency, or polarization of a reflected signal based upon the outbound DAS signal after the outbound DAS signal traverses the DAS fiber coil.

16. The method of claim 15, wherein the plurality of sensing components are arranged in linear fashion.

17. The method of claim 15, wherein the DAS fiber forms a first fiber of a fiber pair, wherein the first fiber is coupled to a DAS transmitter at the DAS station to conduct an outbound signal, and wherein a second fiber of the fiber pair is arranged to conduct a return signal to a receiver at the DAS station, the return signal being derived from the outbound signal after routing through a loopback located at the plurality of spans.

* * * * *